US009211875B2

(12) United States Patent
Harada

(10) Patent No.: US 9,211,875 B2
(45) Date of Patent: Dec. 15, 2015

(54) SUSPENSION CONTROL APPARATUS

(75) Inventor: Naofumi Harada, Yokohama (JP)

(73) Assignee: HITACHI AUTOMOTIVE SYSTEMS, LTD., Ibaraki (JP)

(*) Notice: Subject to any disclaimer, the term of this patent is extended or adjusted under 35 U.S.C. 154(b) by 292 days.

(21) Appl. No.: 13/221,175

(22) Filed: Aug. 30, 2011

(65) Prior Publication Data

US 2012/0053791 A1 Mar. 1, 2012

(30) Foreign Application Priority Data

Aug. 31, 2010 (JP) ................. 2010-194247

(51) Int. Cl.
*B60G 17/06* (2006.01)
*B60T 8/40* (2006.01)
*B60G 17/08* (2006.01)

(52) U.S. Cl.
CPC ............ *B60T 8/4031* (2013.01); *B60G 17/08* (2013.01); *B60G 2400/10* (2013.01); *B60G 2400/102* (2013.01); *B60G 2400/104* (2013.01); *B60G 2400/106* (2013.01); *B60G 2500/10* (2013.01); *B60T 2260/06* (2013.01)

(58) Field of Classification Search
USPC ................ 701/36, 37, 38; 280/5.505, 5.508
See application file for complete search history.

(56) References Cited

U.S. PATENT DOCUMENTS

| | | | | | |
|---|---|---|---|---|---|
| 3,752,497 | A | * | 8/1973 | Enke et al. ................. | 280/5.509 |
| 4,801,155 | A | * | 1/1989 | Fukushima et al. ........ | 280/5.508 |
| 5,087,068 | A | * | 2/1992 | Fukanaga et al. .......... | 280/5.508 |
| 5,088,762 | A | * | 2/1992 | Fukuyama et al. ........ | 280/5.508 |
| 5,104,143 | A | * | 4/1992 | Yonekawa ................. | 280/5.506 |
| 5,228,719 | A | * | 7/1993 | Fukuyama et al. ........ | 280/5.505 |
| 5,251,136 | A | * | 10/1993 | Fukuyama et al. ............. | 701/38 |
| 5,253,174 | A | * | 10/1993 | Inagaki et al. .................. | 701/38 |
| 5,515,274 | A | * | 5/1996 | Mine et al. ...................... | 701/38 |
| 8,170,749 | B2 | * | 5/2012 | Mizuta ............................ | 701/38 |
| 8,744,681 | B2 | * | 6/2014 | Liu et al. ........................ | 701/38 |

(Continued)

FOREIGN PATENT DOCUMENTS

| | | |
|---|---|---|
| JP | 8-238917 | 9/1996 |
| JP | 2003-11635 | 1/2003 |
| JP | 2007-40497 | 2/2007 |

OTHER PUBLICATIONS

Shinjiro Saito et al., "*An Experimental Evaluation of G-Vectoring Vehicle Performance which Decelerates Automatically in Coordination with Lateral Motion*", Transactions of Society of Automotive Engineers of Japan, May 2009, vol. 40, No. 3, pp. 629-634.

(Continued)

*Primary Examiner* — Joshua Rodden
(74) *Attorney, Agent, or Firm* — Wenderoth, Lind & Ponack, L.L.P.

(57) ABSTRACT

To control a wheel load of a wheel according to a lateral acceleration of a vehicle so as to enhance stability of the vehicle, provided is a suspension control apparatus, which is configured to control a wheel-load adjusting mechanism in at least one of the following manners: the wheel load of a front wheel is increased or is made unlikely to be reduced relative to the wheel load of a rear wheel when an absolute value of the lateral acceleration of the vehicle is increasing; and the wheel load of the rear wheel is increased or is made unlikely to be reduced relative to the wheel load of the front wheel when the absolute value of the lateral acceleration of the vehicle is reducing.

21 Claims, 10 Drawing Sheets

(56) References Cited

U.S. PATENT DOCUMENTS

2002/0035423 A1* 3/2002 Shank et al. .................. 701/37
2005/0225048 A1* 10/2005 Kasamatsu ............. 280/124.16
2006/0006615 A1* 1/2006 Mizuta ...................... 280/5.508
2008/0281488 A1* 11/2008 Ryu et al. ..................... 701/38
2009/0030574 A1* 1/2009 Yamakado et al. ............. 701/44

OTHER PUBLICATIONS

Office Action issued Feb. 4, 2014 in corresponding Japanese patent application No. 2010-194247 with partial English translation.

* cited by examiner

US 9,211,875 B2

SUSPENSION CONTROL APPARATUS

BACKGROUND OF THE INVENTION

The present invention relates to a suspension control apparatus to be mounted in a vehicle such as, for example, a four-wheeled automobile, which is suitably used for damping vibrations of the vehicle.

In general, a suspension control apparatus is mounted in a vehicle such as an automobile as described in, for example, Japanese Patent Application Laid-open No. 2003-11635. The suspension control apparatus described in Japanese Patent Application Laid-open No. 2003-11635 includes a damping-force adjusting type shock absorber provided between a vehicle-body side and each axle side. The suspension control apparatus is configured to variably control damping-force characteristics obtained by the shock absorber according to a vehicle attitude caused with a braking operation of a brake.

The suspension control apparatus described in Japanese Patent Application Laid-open No. 2003-11635 controls the damping-force adjusting type shock absorber so as to increase a wheel load of a braked wheel and reduce a wheel load of an non-braked wheel when an antiskid brake system (electronic stability control system) is actuated. According to the above-mentioned method, a braking force is increased by the damping-force adjusting type shock absorber so as to improve running stability. The following document "An Experimental Evaluation of G-Vectoring Vehicle Performance which Decelerates Automatically in Coordination with Lateral Motion" by Shinjiro Saito, Makoto Yamakado, Atsushi Yokoyama, Junya Takahashi, and Masato Abe, Transactions of Society of Automotive Engineers of Japan, May 2009, Volume 40, No. 3, pp. 629 to 634 (hereinafter, referred to as "Non-Patent Document 1"), discloses a configuration which controls an acceleration/deceleration of a vehicle according to a lateral motion of the vehicle to enhance the stability of the vehicle.

By the way, the suspension control apparatus described in Japanese Patent Application Laid-open No. 2003-11635 does not control the damping-force adjusting type shock absorber when the antiskid brake system is not actuated. Therefore, the potential of occurrence of an unstable running state of the vehicle remains the same. Specifically, even for the vehicle in which the suspension control apparatus described above is mounted, a limit value at which the running state of the vehicle becomes unstable to actuate the antiskid brake system is the same as that for a vehicle in which the suspension control apparatus is not mounted. Therefore, the suspension control apparatus described in Japanese Patent Application Laid-open No. 2003-11635 does not have the effects of reducing a likelihood of bringing about the unstable running state described above.

Moreover, in the suspension control apparatus described in Japanese Patent Application Laid-open No. 2003-11635, if a piston rod is in a fully-extended or fully-compressed state when, for example, the antiskid brake system is actuated, the damping force cannot be generated. Therefore, there is a problem in that the wheel loads cannot be controlled in such a state and hence, running stability cannot be improved.

On the other hand, Non-Patent Document 1 discloses the configuration for controlling the acceleration/deceleration of the vehicle according to the lateral motion of the vehicle so as to enhance the stability of the vehicle at cornering. However, the configuration described in Non-Patent Document 1 takes only deceleration control of the vehicle into main consideration and does not take the application to the suspension control apparatus into consideration.

SUMMARY OF THE INVENTION

The present invention has been made in view of the problems described above, and therefore has an object to provide a suspension control apparatus for controlling a wheel load of a wheel according to a lateral acceleration of a vehicle so as to enhance stability of the vehicle.

In order to solve the above-mentioned problems, a suspension control apparatus according to the present invention includes: a wheel-load adjusting mechanism provided between a vehicle body and a wheel of a vehicle, and capable of adjusting a wheel load of the wheel by adjusting a force generated in a direction of a distance between the vehicle body and the wheel; and control means for controlling the wheel-load adjusting mechanism, in which the control means controls the wheel-load adjusting mechanism in at least one of the following manners: the wheel load of a front wheel is increased or is made unlikely to be reduced regardless of a longitudinal acceleration when an absolute value of a lateral acceleration of the vehicle is increasing; and the wheel load of the rear wheel is increased or is made unlikely to be reduced regardless of the longitudinal acceleration when the absolute value of the lateral acceleration of the vehicle is reducing.

Further, a suspension control apparatus according to the present invention includes: a wheel-load adjusting mechanism provided between a vehicle body and a wheel of a vehicle, and capable of adjusting a wheel load of the wheel by adjusting a force generated in a direction of a distance between the vehicle body and the wheel; and control means for controlling the wheel-load adjusting mechanism, in which: the wheel-load adjusting mechanism adjusts the force generated in the direction of the distance between the vehicle body and the wheel so that, as a command current value becomes larger, the wheel load is increased; and the control means uses a lateral acceleration $A_y$, a lateral jerk $dA_y/dt$, a front-wheel side piston acceleration $a_{fr}$, a rear-wheel side piston acceleration $a_{rr}$, tuning control gains $K_{FR}$, $K_{RR}$, $I0_{FR}$, and $I0_{RR}$, and a sign function sgn so that at least one of a front-wheel side command current value $I_{FR}$ and a rear-wheel side command current value $I_{RR}$ satisfies the following relations:

$$I_{FR} = \text{sgn}\left(A_y \frac{dA_y}{dt}\right) K_{FR} a_{fr} + I0_{FR}$$

$$I_{RR} = -\text{sgn}\left(A_y \frac{dA_y}{dt}\right) K_{RR} a_{rr} + I0_{RR}$$

DETAILED DESCRIPTION OF THE INVENTION

Hereinafter, a suspension control apparatus according to embodiments of the present invention is described in detail referring to the accompanying drawings, taking the case where the suspension control apparatus is used for, for example, a four-wheeled automobile.

Figure 1:
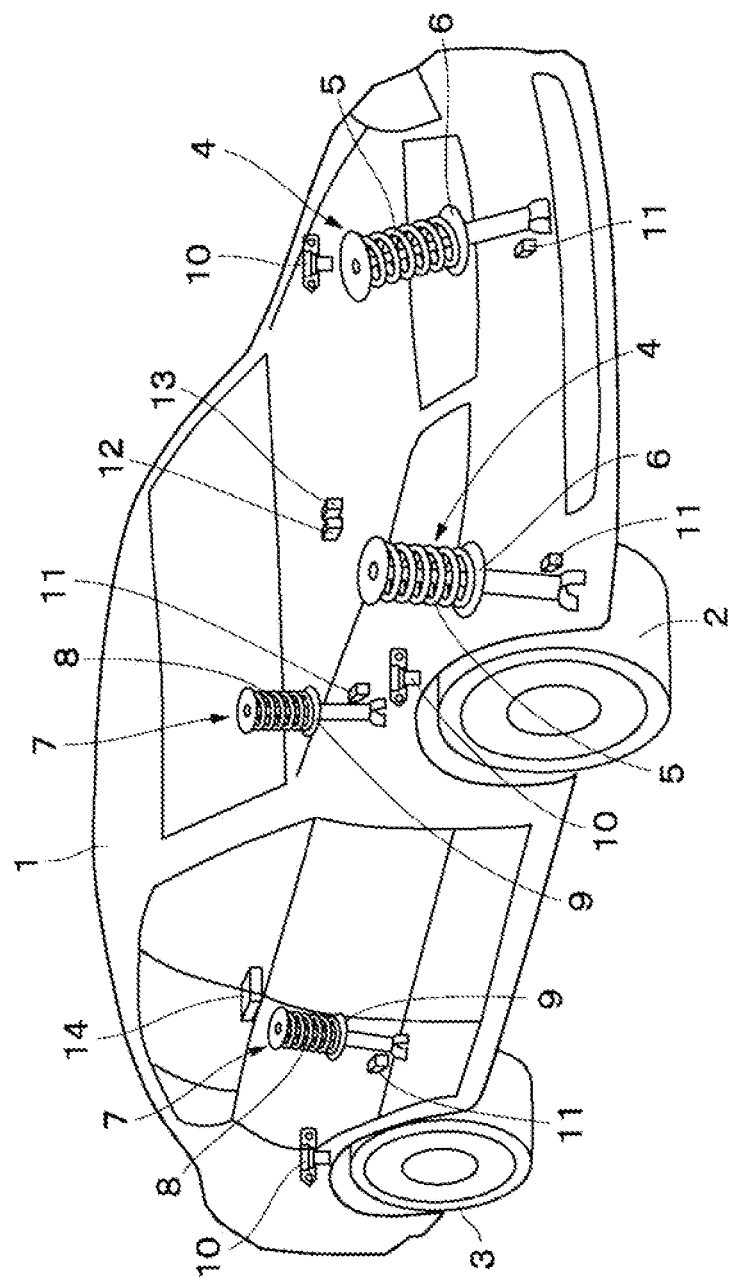
FIG. 1 is a perspective view illustrating a four-wheeled automobile for which a suspension control apparatus according to first to third embodiments of the present invention is used.

FIGS. 1 to 7 illustrate a first embodiment of the present invention. FIG. 1 illustrates a vehicle body 1 constituting a body of a vehicle. Below the vehicle body 1, for example, right and left front wheels 2 (only one thereof is shown) and right and left rear wheels 3 (only one thereof is shown) are provided.

Front-wheel side suspension devices 4 are provided between the right front wheel 2 side and the vehicle body 1 and between the left front wheel 2 side and the vehicle body 1, respectively. One of the front-wheel side suspension devices 4 includes a right suspension spring 5 (hereinafter, referred to simply as "spring 5") and a right damping-force adjusting type shock absorber 6 (hereinafter, referred to as "damping-force variable damper 6" provided between the right front wheel 2 side and the vehicle body 1 in parallel to the right spring 5. In the same manner, the other front-wheel side suspension device 4 includes a left spring 5 and a left damping-force variable damper 6 provided between the left front wheel 2 side and the vehicle body 1 in parallel to the left spring 5.

Rear-wheel side suspension devices 7 are provided between the right rear wheel 3 side and the vehicle body 1 and between the left rear wheel 3 side and the vehicle body 1, respectively. One of the rear-wheel side suspension devices 7 includes a right suspension spring 8 (hereinafter, referred to simply as "spring 8") and a right damping-force adjusting type shock absorber 9 (hereinafter, referred to as "damping-force variable damper 9") provided between the right rear wheel 3 side and the vehicle body 1 in parallel to the right spring 8. In the same manner, the other rear-wheel side suspension device 7 includes a left spring 8 and a left damping-force variable damper 9 provided between the left rear wheel 3 side and the vehicle body 1 in parallel to the left spring 8.

Each of the damping-force variable dampers 6 and 9 respectively included in the suspension devices 4 and 7 is configured by using a damping-force adjusting hydraulic shock absorber. The damping-force variable dampers 6 and 9 adjust a force generated in a direction of a distance between the vehicle body 1 and the wheels 2 and 3 to adjust wheel loads of the wheels 2 and 3. Therefore, each of the damping-force variable dampers 6 and 9 is provided with a wheel-load adjusting mechanism including a damping-force adjusting valve and an actuator (not shown) so as to continuously adjust a damping-force characteristic thereof from a hard characteristic to a soft characteristic.

The damping-force adjusting valve is not necessarily required to have a configuration of continuously changing the damping-force characteristic and may also have a configuration of intermittently adjusting the damping-force characteristic in two steps, three steps, or more. For the damping-force adjusting valve, a well-known structure using a pressure-control method for controlling a pilot pressure of a damping-force generating valve, a flow-rate control method for controlling a passage area, or the like can be used.

A plurality of sprung acceleration sensors 10 are provided to the vehicle body 1 so as to detect a vertical vibration acceleration on the vehicle body 1 side corresponding to a sprung side. Each of the sprung acceleration sensors 10 is mounted to the vehicle body 1 at a position in the vicinity of an upper end side (rod projecting end side) of each of the damping-force variable dampers 6 on the sides of the right and left front wheels 2 and each of the damping-force variable dampers 9 on the sides of the rear wheels 3. The sprung acceleration sensors 10 constitute a road-surface state detector for detecting a road-surface state as a vertical vibration acceleration while the vehicle is running, which outputs a detection signal to a controller 14 described below. The sprung acceleration sensors 10 may be provided to all the four wheels. Alternatively, three sprung acceleration sensors 10 may be provided to the right and left front wheels 2 and any one of the right and left rear wheels 3. Further alternatively, only one sprung acceleration sensor 10 may be provided to the vehicle body 1 so that the vertical vibration acceleration may be estimated from a value of a lateral acceleration sensor 12 and/or a longitudinal acceleration sensor 13 described below.

Moreover, a plurality of unsprung acceleration sensors 11 are provided. Specifically, each of the unsprung acceleration sensors 11 is provided on the side of each of the front wheels 2 and the rear wheels 3 of the vehicle. Each of the unsprung acceleration sensors 11 detects a vertical vibration acceleration for each of the wheels on the side of each of the right and left front wheels 2 and the right and left rear wheels 3 and outputs a detection signal to the controller 14 described below.

The acceleration signal on the unsprung (axle) side, which is output from each of the unsprung acceleration sensors 11, is subjected to subtraction processing with respect to the acceleration signal on the sprung (vehicle body 1) side, which is output from each of the sprung acceleration sensors 10 in computation processing (see Step 4 illustrated in FIG. 3) performed by the controller 14 described below. By the subtraction processing, piston accelerations $a_{fr}$ and $a_{rr}$ between the sprung side and the unsprung side, specifically, extension/compression accelerations of the dampers 6 and 9 are calculated. The piston acceleration $a_{fr}$ is the extension/compression acceleration of each of the damping-force variable dampers 6 on the front-wheel side, whereas the piston acceleration $a_{rr}$ is the extension/compression acceleration of each of the damping-force variable dampers 9 on the rear-wheel side. The piston accelerations $a_{fr}$ and $a_{rr}$ are also referred to as piston relative accelerations.

By integrating the piston accelerations $a_{fr}$ and $a_{rr}$, vertical relative velocities between each of the front wheels 2 and the vehicle body 1 and between each of the rear wheels 3 and the vehicle body 1, specifically, extension/compression velocities of each of the dampers 6 and each of the dampers 9 are respectively calculated.

The lateral acceleration sensor 12 is provided to the vehicle body 1. The lateral acceleration sensor 12 detects a lateral acceleration $A_y$ in a horizontal direction of the vehicle and then outputs a detection signal to the controller 14 described below.

The longitudinal acceleration sensor 13 is also provided to the vehicle body 1. The longitudinal acceleration sensor 13 is provided in the vicinity of, for example, the lateral acceleration sensor 12 to detect a longitudinal acceleration $A_x$ in a longitudinal direction of the vehicle and then output a detection signal to the controller 14 described below.

Figure 2:
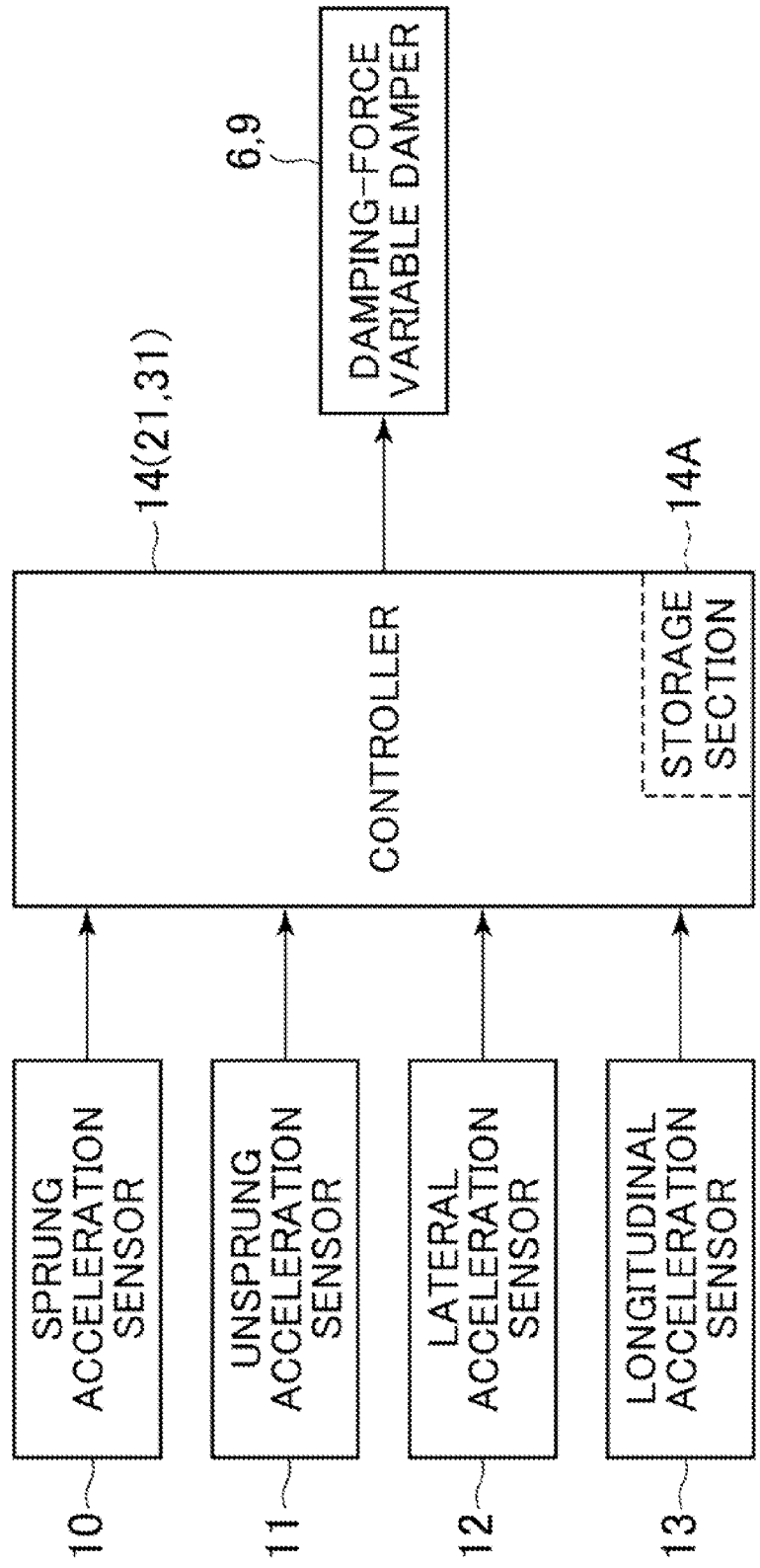
FIG. 2 is a control block diagram illustrating the suspension control apparatus according to the first to third embodiments of the present invention.

The controller 14 is provided as control means including a microcomputer and the like. As illustrated in FIG. 2, an input side of the controller 14 is connected to the sprung acceleration sensors 10, the unsprung acceleration sensors 11, the lateral acceleration sensor 12, the longitudinal acceleration sensor 13, and the like, whereas an output side thereof is connected to the actuators (not shown) of the damping-force variable dampers 6 and 9, and the like.

Figure 3:
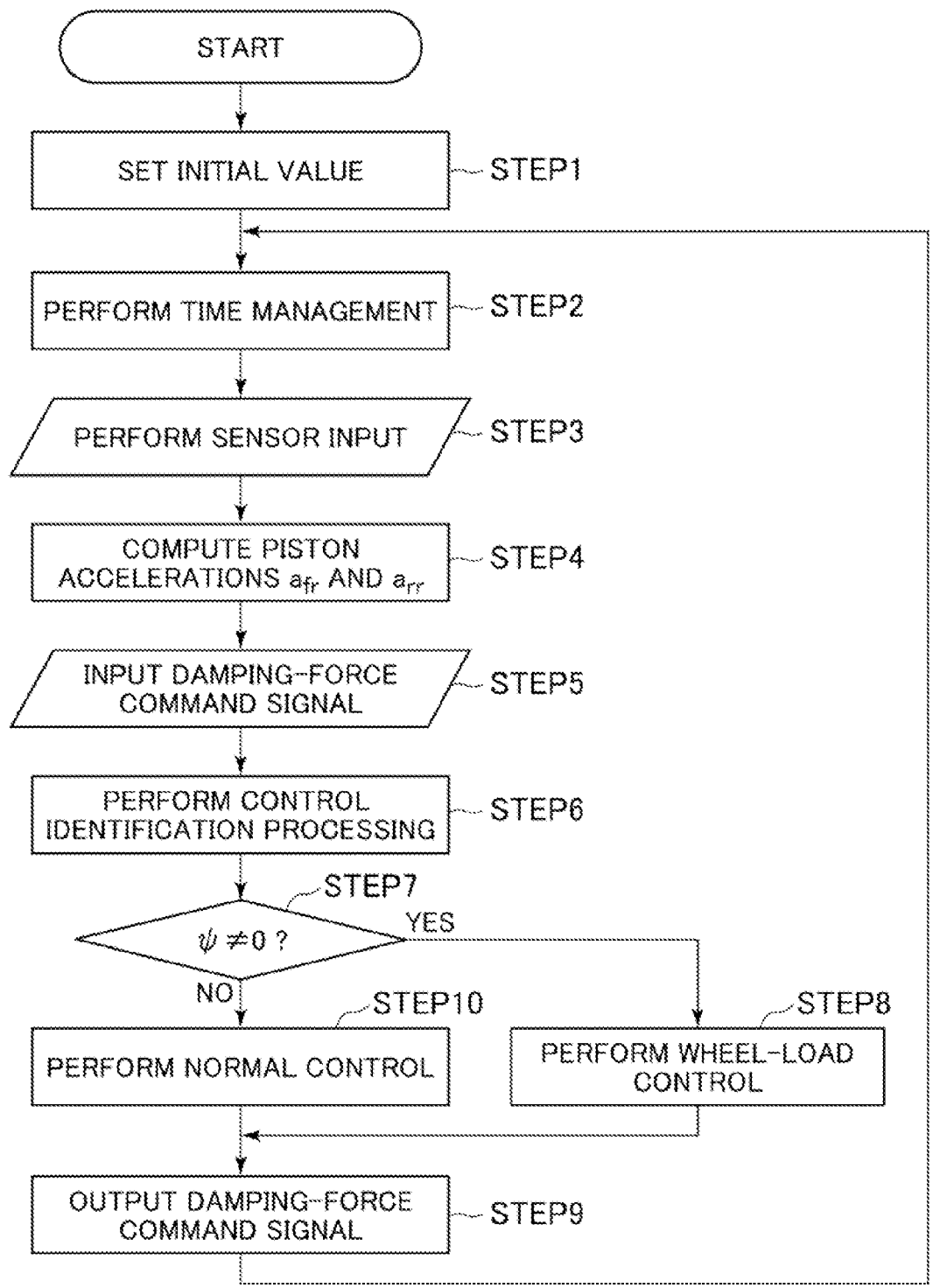
FIG. 3 is a flowchart illustrating damping-force control processing for each wheel by a controller illustrated in FIG. 2.
Figure 4:
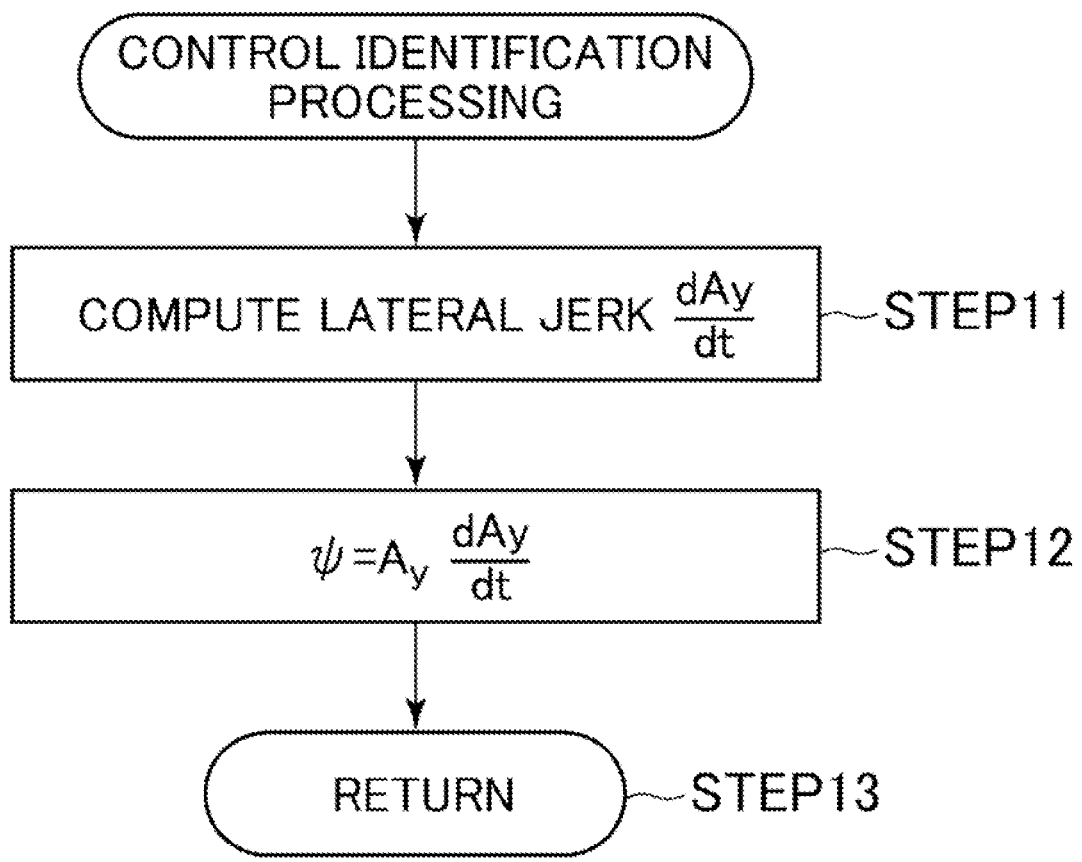
FIG. 4 is a flowchart illustrating control identification processing performed in Step 6 illustrated in FIG. 3.
Figure 5:
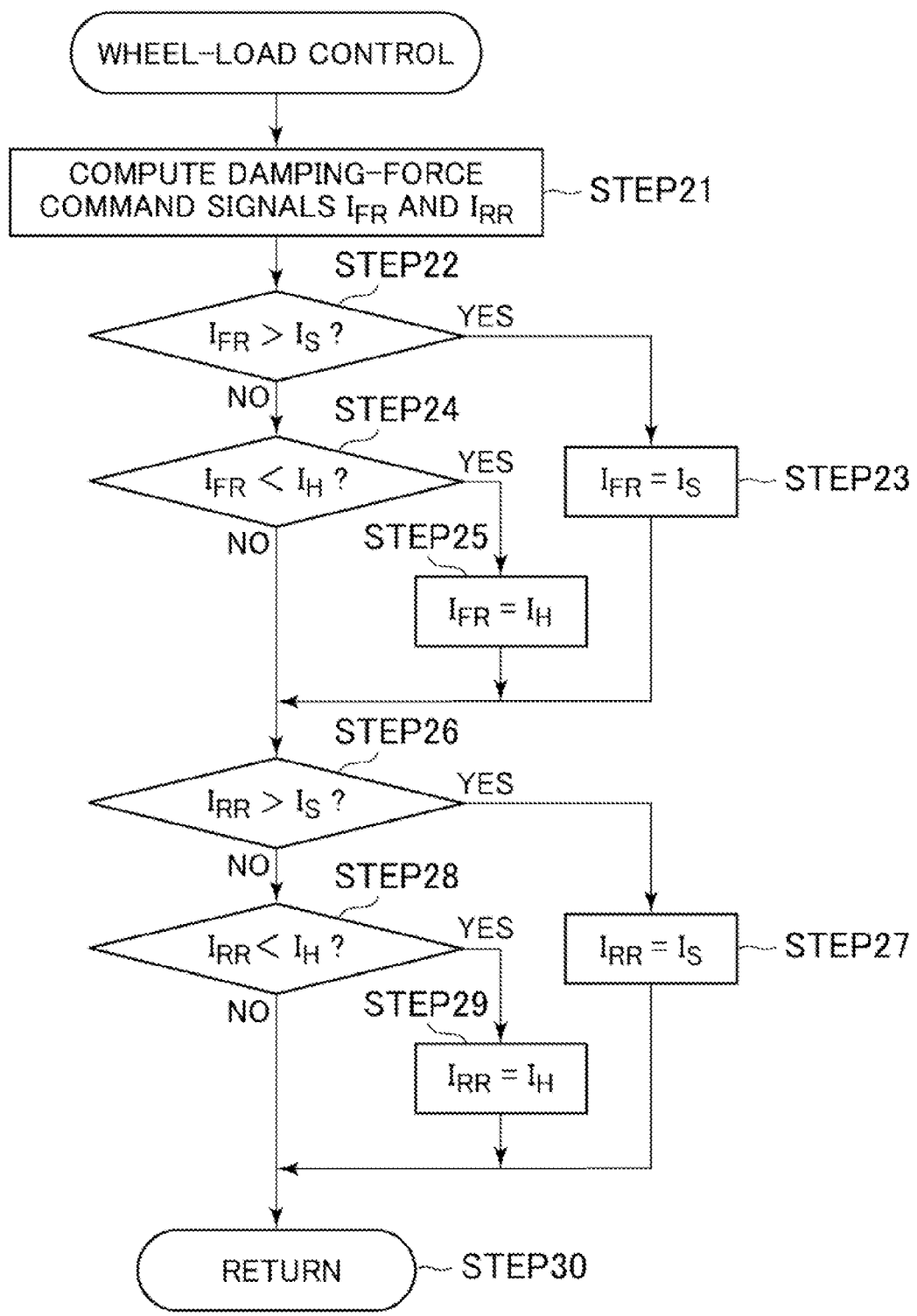
FIG. 5 is a flowchart illustrating wheel-load control illustrated in FIG. 3.

The controller 14 includes a storage section 14A including a ROM, a RAM, a non-volatile memory, or the like. A program for control processing, which executes processing illustrated in flowcharts of FIGS. 3 to 5, is stored in the storage section 14A. The controller 14 performs computation processing on a damping-force command signal to be output to the actuator (not shown) of each of the damping-force variable dampers 6 and 9 as a command current value according to damping-force control processing for each wheel, which is illustrated in FIG. 3. A damping force generated by each of the damping-force variable dampers 6 and 9 is variably controlled continuously or in a plurality of steps between a hard damping force and a soft damping force according to the command current value (damping-force command signal) fed to the actuator.

The suspension control apparatus according to this embodiment has the configuration as described above. Next, processing for variably controlling the damping-force characteristic of each of the damping-force variable dampers 6 and 9 by the controller 14 is described.

First, the controller 14 executes damping-force control processing for each wheel as illustrated in FIG. 3 while the vehicle is running. Specifically, in Step 1 of FIG. 3, initial setting is performed. In subsequent Step 2, time management is performed so as to adjust a control cycle for control processing executed in Step 3 and the subsequent steps to, for example, about several milliseconds. Then, in Step 3, sensor input is performed so as to read signals from the sprung acceleration sensors 10, the unsprung acceleration sensors 11, the lateral acceleration sensor 12, and the longitudinal acceleration sensor 13.

In subsequent Step S4, the piston acceleration $a_{fr}$ or $a_{rr}$ and the relative velocity for each wheel is obtained by computations. In this case, the unsprung-side acceleration signal obtained by each of the unsprung acceleration sensors 11 and the sprung-side acceleration signal obtained by a corresponding one of the sprung acceleration sensors 10 are subjected to subtraction processing to calculate the piston acceleration $a_{fr}$ or $a_{rr}$ between the sprung side and the unsprung side. Moreover, by integrating the piston accelerations $a_{fr}$ and $a_{rr}$, the vertical relative velocities between each of the front wheels 2 and the vehicle body 1 and between each of the rear wheels 3 and the vehicle body 1 are respectively calculated. The piston acceleration $a_{fr}$ or $a_{rr}$ and the relative velocity are indicated with an extension side of the damper set as a positive side and a compression side of the damper set as a negative side.

In subsequent Step 5, the damping-force command signal according to the results of computations described above is input. In subsequent Step 6, a control identification coefficient ψ for identifying whether or not an absolute value of the lateral acceleration $A_y$ of the vehicle is changing, specifically, whether or not the absolute value of the lateral acceleration $A_y$ of the vehicle is in any one of an increasing state and a reducing state, is computed based on the lateral acceleration signal from the lateral acceleration sensor 12. Specifically, control identification processing illustrated in FIG. 4 is performed so that the control identification coefficient ψ is calculated from the lateral acceleration $A_y$. Then, in Step 7, whether or not to execute wheel-load control is determined based on the control identification coefficient ψ. The lateral acceleration $A_y$ is indicated while the left side of the vehicle is set as a positive side and the right side is set as a negative side.

When the result of determination in Step 7 is "Yes", the absolute value of the lateral acceleration $A_y$ of the vehicle is currently increasing or reducing. Therefore, the processing proceeds to subsequent Step 8 where the wheel-load control is performed so that, as illustrated in FIG. 5 described below, a damping-force command signal $I_{FR}$ or $I_{RR}$ for each wheel according to the lateral acceleration $A_y$ and the piston acceleration $a_{fr}$ or $a_{rr}$ is computed. In subsequent Step 9, the damping-force command signal (target damping-force signal) is output for each wheel so that variable control of the damping force is performed for variably controlling the wheel load for each wheel. Thereafter, the processing performed in Step 2 and the subsequent steps is repeated.

When the result of determination in Step 7 is "NO", the absolute value of the lateral acceleration $A_y$ of the vehicle becomes constant without changing. Therefore, the processing proceeds to Step 10 where computation processing of the damping-force command signal for each wheel is executed as normal control. As the normal control, vibration suppression control such as skyhook control, bad-condition road control while the vehicle is running on a road in bad conditions, anti-roll control, anti-dive control, and anti-squat control are performed. Then, in subsequent Step 9, the damping-force command signal (target damping-force signal) for each wheel, which is computed in Step 10, is output so as to variably control the damping force.

Although the normal control is performed when it is determined in Step 7 illustrated in FIG. 3 that the control identification coefficient ψ is zero (ψ=0), the wheel-load control may be performed in this step. In this case, for example, when the control identification coefficient ψ becomes zero (ψ=0), the damping-force command signal $I_{FR}$ or $I_{RR}$ may be computed after the control identification coefficient ψ is delayed by one sample to be changed to have a value of the control identification coefficient ψ before zero is calculated. Alternatively, the damping-force command signal $I_{FR}$ or $I_{RR}$ may be delayed by one sample so that the previous damping-force command signal $I_{FR}$ or $I_{RR}$ is output. Further alternatively, a counter may be provided between Step 6 and Step 7 illustrated in FIG. 3 so that the normal control is performed after a state in which the control identification coefficient ψ becomes zero (ψ=0) continues for a predetermined period of time.

Next, the control identification processing (Step 6) illustrated in FIG. 3 is described referring to FIG. 4. First, in Step 11, the lateral acceleration $A_y$ is subjected to temporal differentiation so as to compute a lateral jerk $(dA_y/dt)$. Next, in Step 12, the control identification coefficient ψ is computed by using a product of the lateral acceleration $A_y$ and the lateral jerk $(dA_y/dt)$ as expressed by Formula 1 below, and then the processing proceeds to Step 13 to return.

$$\phi = A_y \frac{dA_y}{dt} \quad \text{[Formula 1]}$$

Next, the wheel-load control illustrated in FIG. 5 is described. First, in Step 21, the damping-force command signal $I_{FR}$ corresponding to a front-wheel side command current value is computed from the piston acceleration $a_{fr}$ based on the following Formula 2. In addition, based on the following Formula 3, the damping-force command signal $I_{RR}$ corresponding to a rear-wheel side command current value is computed from the piston acceleration $a_{rr}$.

$$I_{FR} = \text{sgn}\left(A_y \frac{dA_y}{dt}\right) K_{FR} a_{fr} + I0_{FR} \quad \text{[Formula 2]}$$

$$I_{RR} = -\text{sgn}\left(A_y \frac{dA_y}{dt}\right) K_{RR} a_{rr} + I0_{RR} \quad \text{[Formula 3]}$$

Here, a sign function $\text{sgn}(\psi)$ outputs "1" when the control identification coefficient $\psi$ is positive ($\psi>0$), "−1" when the control identification coefficient $\psi$ is negative ($\psi<0$), and "0" when the control identification coefficient $\psi$ is zero ($\psi=0$), as expressed by Formula 4. Control gains $K_{FR}$, $K_{RR}$, $I0_{FR}$, and $I0_{RR}$ may be constant values or variable values. When the control gains $K_{FR}$, $K_{RR}$, $I0_{FR}$, and $I0_{RR}$ are set as constant values, constant values previously determined by tuning may he read in the initial setting performed in Step 1. On the other hand, when the control gains $K_{FR}$, $K_{RR}$, $I0_{FR}$, and $I0_{RR}$ are set as variable values, the control gains $K_{FR}$, $K_{RR}$, $I0_{FR}$, and $I0_{RR}$ may be changed according to driver operation conditions or vehicle conditions by using, for example, the lateral acceleration $A_y$, the longitudinal acceleration $A_x$, a vehicle velocity $v_x$, and a steering angular velocity.

$$\text{sgn}(\phi) = \begin{cases} 1 : \phi > 0 \\ 0 : \phi = 0 \\ -1 : \phi < 0 \end{cases} \quad \text{[Formula 4]}$$

As expressed by Formula 2, the front-wheel side damping-force command signal $I_{FR}$ changes according to the piston acceleration $a_{fr}$. When the absolute value of the lateral acceleration $A_y$ of the vehicle is increasing, the wheel load of each of the front wheels 2 is increased or is made unlikely to be reduced regardless of the longitudinal acceleration $A_x$. In this case, a sign of the sign function for the rear-wheel side damping-force command signal $I_{RR}$ is inverse to that for the damping-force command signal $I_{FR}$ so that the same effects are produced. Therefore, when the piston accelerations $a_{fr}$ and $a_{rr}$ have the same value, the rear-wheel side damping-force command signal $I_{RR}$ changes in the phase opposite to that of the front-wheel side damping-force command signal $I_{FR}$.

As expressed by Formula 3, the rear-wheel side damping-force command signal $I_{FR}$ changes according to the piston acceleration $a_{rr}$. When the absolute value of the lateral acceleration $A_y$ of the vehicle is reducing, the wheel load of each of the rear wheels 3 is increased or is made unlikely to be reduced regardless of the longitudinal acceleration $A_x$. In this case, the sign of the sign function for the front-wheel side damping-force command signal $I_{FR}$ is inverse to that for the rear-wheel side damping-force command signal $I_{RR}$ so that the same effects are produced.

Then, the damping-force command signals $I_{FR}$ and $I_{RR}$ are computed as signals increasing from a hard command signal $I_H$ to a soft command signal $I_S$ ($I_S>I_H$) in proportion to the piston accelerations $a_{fr}$ and $a_{rr}$, respectively.

Next, in Steps 22 to 25, saturation processing of the front-wheel side damping-force command signal $I_{FR}$ is performed so that the front-wheel side damping-force command signal $I_{FR}$ has a value within the range between the hard command signal $I_H$ and the soft command signal $I_S$. Specifically, in Step 22, it is determined whether or not the front-wheel side damping-force command signal $I_{FR}$ in Step 21 has a larger value than the soft command signal $I_S$ ($I_{FR}>I_S$). When the result of determination is "YES", the processing proceeds to next Step 23 where the saturation processing is performed so as to set the damping-force command signal $I_{FR}$ to the soft command signal $I_S$ ($I_{FR}=I_S$).

On the other hand, when the result of determination in Step 22 is "NO", it is determined that the damping-force command signal $I_{FR}$ is smaller than the soft command signal $I_S$. Therefore, the processing proceeds to next Step 24 where it is determined whether or not the damping-force command signal $I_{FR}$ has a smaller value than the hard command signal $I_H$ ($I_{FR}<I_H$). When the result of determination in Step 24 is "YES", the processing proceeds to next Step 25 where the saturation processing is performed so as to set the damping-force command signal $I_{FR}$ to the hard command signal $I_H$ ($I_{FR}=I_H$).

On the other hand, when the result of determination in Step 24 is "NO", the damping-force command signal $I_{FR}$ has a value within the range between the hard command signal $I_H$ and the soft command signal $I_S$ ($I_H \leq I_{FR} \leq I_S$). Therefore, the value of the damping-force command signal $I_{FR}$ is retained as it is, and then the processing proceeds to Step 26.

Next, in Steps 26 to 29, substantially the same saturation processing as that in Steps 22 to 25 is performed so that the rear-wheel side damping-force command signal $I_{RR}$ has a value within the range between the hard command signal $I_H$ and the soft command signal $I_S$. As a result, similarly to the front-wheel side damping-force command signal $I_{FR}$, the value of the rear-wheel side damping-force command signal $I_{RR}$ is also set within the range between the hard command signal $I_H$ and the soft command signal $I_S$ ($I_H \leq I_{RR} \leq I_S$). Then, after the termination of the saturation processing of the rear-wheel side damping-force command signal $I_{RR}$ in Steps 26 to 29, the processing proceeds to Step 30 to return.

The soft command signal $I_S$ is for relatively shifting the command signal to the soft side by a predetermined value from the previous damping-force command signal $I_{FR}$ or $I_{RR}$, and therefore does not necessarily mean a two-step switching signal for shifting the command signal from the hard side to the soft side. The soft command signal $I_S$ may be changed according to other conditions such as the vehicle velocity.

The suspension control apparatus according to this embodiment executes the control processing as described above. Next, characteristics of the damping-force command signals $I_{FR}$ and $I_{RR}$ and the wheel load while the vehicle is running are described.

First, the acceleration signals from the sprung acceleration sensors 10 and the unsprung acceleration sensors 11 as well as the lateral acceleration signal from the lateral acceleration sensor 12 are input to the controller 14 while the vehicle is running. At this time, the controller 14 computes the piston accelerations $a_{fr}$ and $a_{rr}$ for the respective wheels based on differences between the acceleration signals from the sprung acceleration sensors 10 and the unsprung acceleration sensors 11. Moreover, the controller 14 performs the temporal differentiation on the lateral acceleration $A_y$ to compute the lateral jerk ($dA_y/dt$) and uses the product of the lateral acceleration $A_y$ and the lateral jerk ($dA_y/dt$) to compute the control identification coefficient $\psi$. Then, the controller 14 uses the control identification coefficient $\psi$ and the piston accelerations $a_{fr}$ and $a_{rr}$ to compute the damping-force command signals $I_{FR}$ and $I_{RR}$, respectively.

The control identification coefficient $\psi$ is calculated based on the lateral acceleration $A_y$, and therefore is determined regardless of the longitudinal acceleration $A_x$ of the vehicle. The control identification coefficient $\psi$ becomes zero when any one of the lateral acceleration $A_y$ and the lateral jerk ($dA_y/dt$) is zero. Then, when the control identification coefficient $\psi$ has a positive or negative value, the damping-force command signal $I_{FR}$ has a value proportional to the piston acceleration $a_{fr}$, whereas the damping-force command signal $I_{RR}$ has a value proportional to the piston acceleration $a_{rr}$.

Therefore, when the absolute value of the lateral acceleration $A_y$ is increasing, the front-wheel side damping-force command signal $I_{FR}$ is set to a value which increases or is unlikely to reduce the wheel load of each of the front wheels. With a change in the wheel load of each of the front wheels, the wheel load of each of the rear wheels is reduced or becomes unlikely to be increased. On the other hand, when the absolute value of the lateral acceleration $A_y$ is reducing, the front-wheel side damping-force command signal $I_{FR}$ is set to a value which reduces or is unlikely to increase the wheel load of each of the front wheels. With a change in the wheel load of each of the front wheels, the wheel load of each of the rear wheels is increased or becomes unlikely to be reduced.

Similarly, when the absolute value of the lateral acceleration $A_y$ is increasing, the rear-wheel side damping-force command signal $I_{RR}$ is set to a value which reduces or is unlikely to increase the wheel load of each of the rear wheels. With a change in the wheel load of each of the rear wheels, the wheel load of each of the front wheels is increased or becomes unlikely to be reduced. On the other hand, when the absolute value of the lateral acceleration $A_y$ is reducing, the rear-wheel side damping-force command signal $I_{RR}$ is set to a value which increases or is unlikely to reduce the wheel load of each of the rear wheels. With a change in the wheel load of each of the rear wheels, the wheel load of each of the front wheels is reduced or becomes unlikely to be increased.

Figure 6:
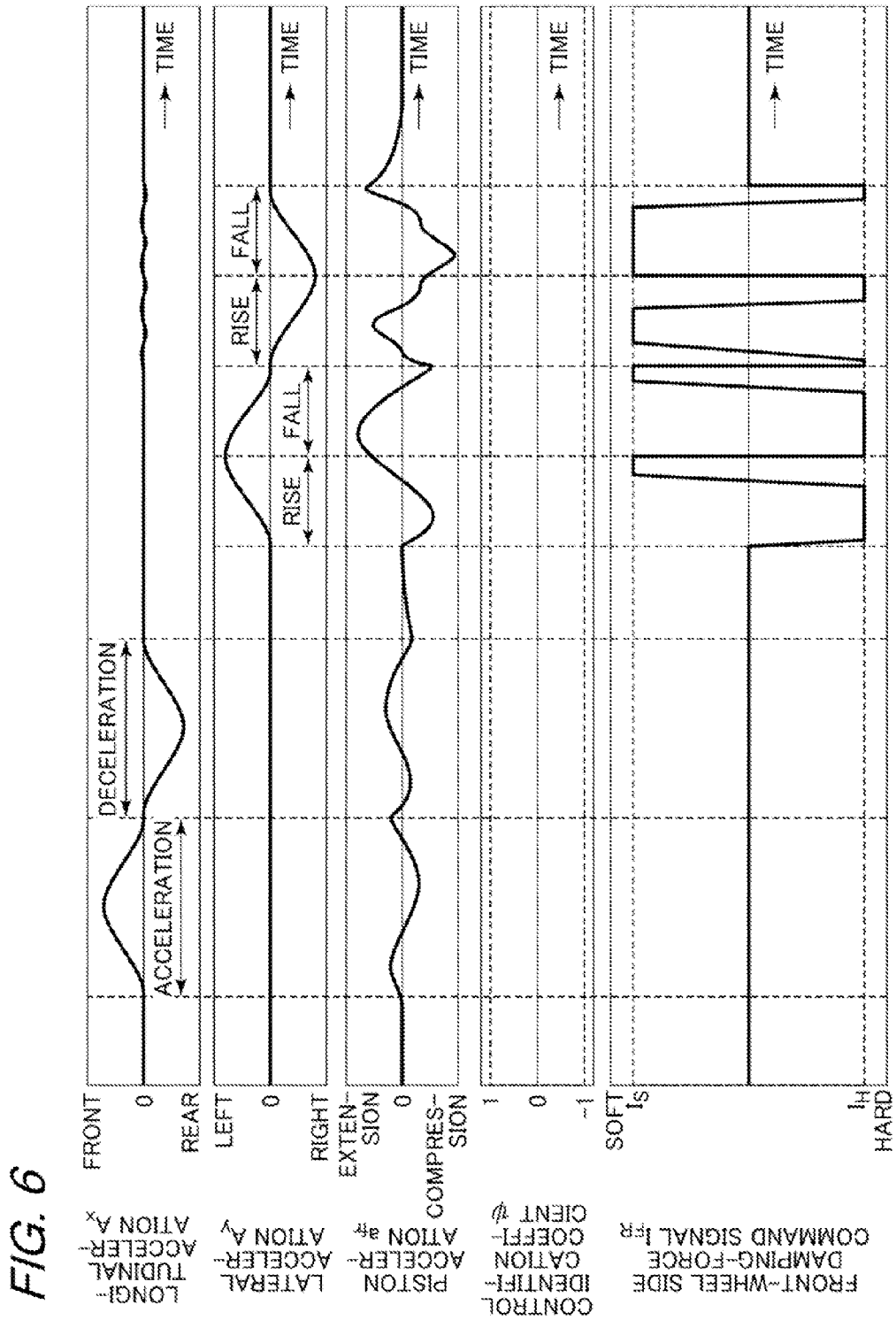
FIG. 6 is a characteristic line diagram schematically illustrating temporal changes in longitudinal acceleration, lateral acceleration, piston acceleration, control identification coefficient, and front-wheel side damping-force command signal according to the first embodiment.

Specifically, in this embodiment, in the case where the absolute value of the lateral acceleration $A_y$ changes, for example, when the vehicle makes a turn, the wheel-load control as described above is performed. The effects of the wheel-load control described above are described more specifically with reference to FIG. 6. FIG. 6 schematically illustrates temporal changes in the damping-force command signal $I_{FR}$ of one of the front wheels, and the like while the vehicle is running.

Although FIG. 6 only illustrates the damping-force command signal $I_{FR}$ of one of the front wheels, the rear-wheel side damping-force command signal $I_{RR}$ can be obtained in a similar manner based on Formula 3. For example, when the longitudinal acceleration $A_x$ and the lateral acceleration $A_y$ illustrated in FIG. 6 are generated and the piston acceleration $a_{rr}$ of one of the rear wheels changes in the same manner as that of the piston acceleration $a_{fr}$ of one of the front wheels, which is illustrated in FIG. 6, the damping-force command signal $I_{RR}$ of the one of the rear wheels has a phase opposite to that of the damping-force command signal $I_{FR}$ of one of the front wheels, which is illustrated in FIG. 6.

However, the damping-force command signal $I_{FR}$ for the piston acceleration $a_{fr}$ of one of the front wheels 2 and the damping-force command signal $I_{RR}$ for the piston acceleration $a_{rr}$ of one of the rear wheels 3 depend on parameter tuning of the control gains $K_{FR}$, $K_{RR}$, $I0_{FR}$ and $I0_{RR}$. Therefore, even in a state in which the piston acceleration $a_{fr}$ and $a_{rr}$ have the same value, the same value is not necessarily output as the damping-force command signal $I_{FR}$ of the one of the front wheels 2 and the damping-force command signal $I_{RR}$ of the one of the rear wheels 3. Moreover, the damping force of the damping-force variable damper 6 in response to the damping-force command signal $I_{FR}$ depends on conditions of each of the front wheels 2 and specifications of the damping-force variable damper 6, whereas the damping-force of the damping-force variable damper 9 in response to the damping-force command signal $I_{RR}$ depends on conditions of each of the rear wheels 3 and specifications of the damping-force variable damper 9. Therefore, even when the damping-force command signals $I_{FR}$ and $I_{RR}$ have the same value, the damping-force variable dampers 6 and 9 do not necessarily generate the same damping force.

As illustrated in FIG. 6, when, for example, the vehicle accelerates or decelerates while moving linearly, the lateral acceleration $A_y$ remains unchanged whereas the longitudinal acceleration $A_x$ changes. Thus, the control identification coefficient $\psi$ becomes zero regardless of the longitudinal acceleration $A_x$. As a result, the damping-force command signal $I_{FR}$ is retained to a constant value.

On the other hand, when the absolute value of the lateral acceleration $A_y$ changes as in the case where the vehicle makes a turn, the damping-force command signal $I_{FR}$ changes according to the piston acceleration $a_{fr}$. Specifically, in a time zone in which the lateral acceleration $A_y$ rises, the damping-force command signal $I_{FR}$ increases or is unlikely to reduce the wheel load of each of the front wheels 2. As a result, the wheel load of each of the rear wheels 3 is reduced or becomes unlikely to be increased. In a time zone in which the lateral acceleration $A_y$ falls, the damping-force command signal $I_{FR}$ reduces or is unlikely to increase the wheel load of each of the front wheels 2. As a result, the wheel load of each of the rear wheels 3 is increased or becomes unlikely to be reduced. In this manner, the front wheels and the rear wheels have a relative relation.

As a result, in this embodiment, the wheel loads of the front wheels 2 and the rear wheels 3 are controlled according to increase and reduction in the lateral acceleration $A_y$ so as to enhance steering responsiveness and stability when the vehicle makes a turn. The reason is as follows.

The following is known for a skilled driver. A skilled driver performs deceleration when the lateral acceleration $A_y$ rises and performs acceleration when the lateral acceleration $A_y$ falls. In this manner, the steering responsiveness and the stability of the vehicle are improved to realize quick and stable cornering. At this time, the skilled driver operates a brake for deceleration when additionally turning a steering wheel and operates an accelerator for acceleration when returning the steering wheel toward a center steering position so that the lateral acceleration $A_y$ and the longitudinal acceleration $A_x$ have a relation describing a circle. Specifically, the skilled driver performs control so that the longitudinal acceleration $A_x$ reduces when the lateral acceleration $A_y$ rises and the longitudinal acceleration $A_x$ increases when the lateral acceleration $A_y$ falls.

According to the G-Vectoring control described in Non-Patent Document 1, the longitudinal acceleration $A_x$, which may be generated by the skilled driver, is generated by braking-force control according to the lateral acceleration $A_y$ generated by the operation performed by the driver. In this manner, a turn, which may be made by the skilled driver, is realized.

When the control of the longitudinal acceleration $A_x$ described above, which is generated by the skilled driver, is considered in terms of the wheel load, the deceleration corresponds to a load shift to the front-wheel side. As a result of the load shift, the wheel loads of the front wheels 2 increase, whereas the wheel loads of the rear wheels 3 reduce. On the other hand, the acceleration corresponds to a load shift to the rear-wheel side, and as a result of the load shift, the wheel loads of the front wheels 2 reduce, whereas the wheel loads of the rear wheels 3 increase.

Specifically, if the skilled driver performs control so that the control suspension increases or reduces the wheel loads of the front wheels 2 or the rear wheels 3 in the conditions of the lateral acceleration $A_y$, under which the acceleration or deceleration is to be performed, the turn which achieves both steering responsiveness and stability can be realized by the wheel-load control. In this embodiment, based on the viewpoints described above, the damping-force command signals $I_{FR}$ and $I_{RR}$ according to a change in the lateral acceleration $A_y$ are output regardless of the longitudinal acceleration $A_x$ so as to control the wheel loads of the front and rear wheels.

The above-mentioned suspension control is performed according to vehicle movement. Therefore, appropriate wheel-load control according to a vehicle movement state can be performed even when an antiskid brake system is not actuated. Therefore, the likelihood of bringing about an unstable running state in which the antiskid brake system is actuated can be reduced. Moreover, the wheel-load control is performed according to the vehicle movement state. Therefore, even if the dampers 6 and 9 are in a fully-extended or fully-compressed state when, for example, the antiskid brake system is actuated, the wheel loads can be controlled even before the occurrence of such a state. Thus, even in a state in which the wheel loads cannot be controlled when the antiskid brake system is actuated, the wheel loads in consideration of the above-mentioned state can be applied in advance to the vehicle.

Figure 7:
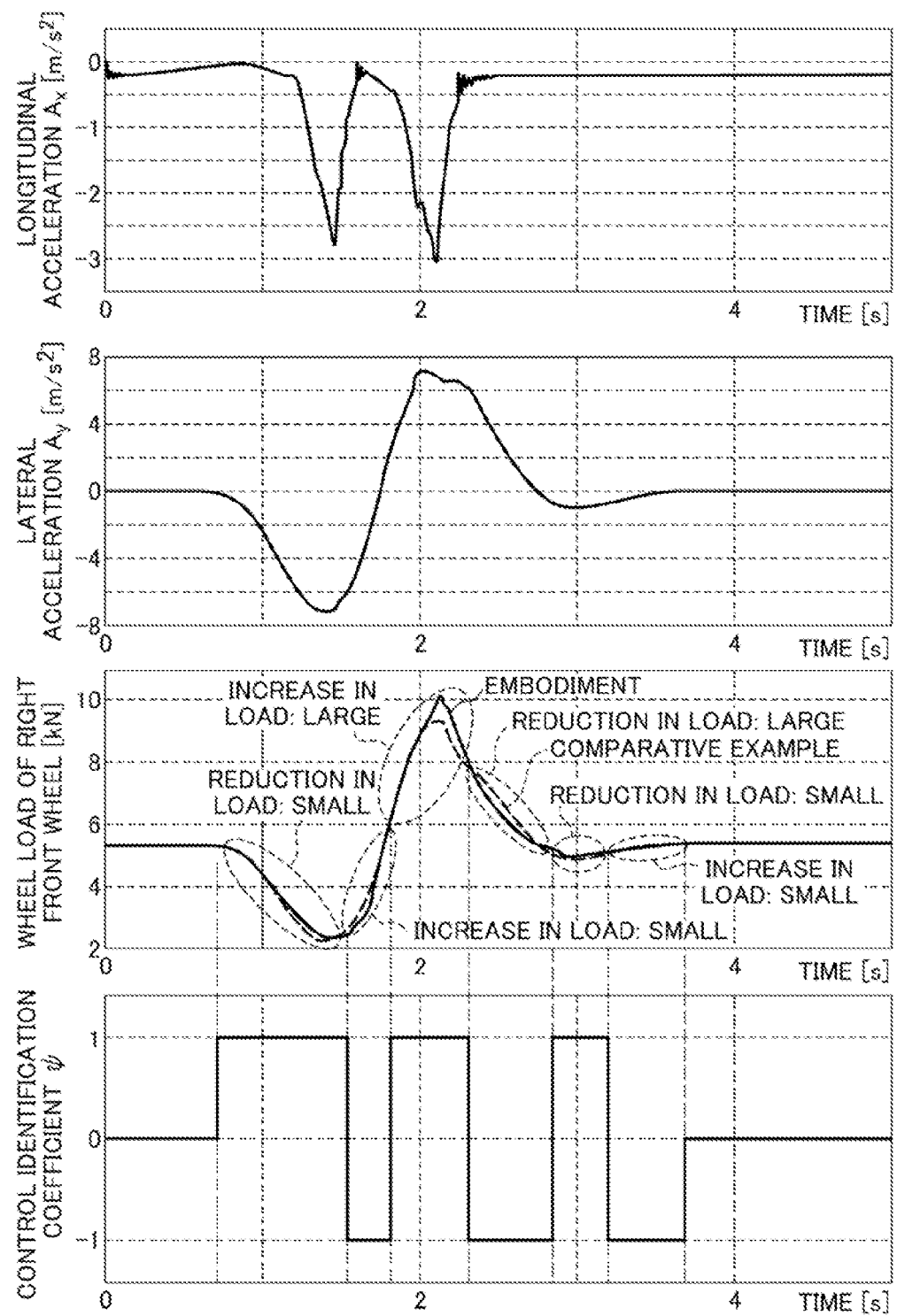
FIG. 7 is a characteristic line diagram illustrating temporal changes in the longitudinal acceleration, the lateral acceleration, a wheel load of a right front wheel, and the control identification coefficient according to the first embodiment.

In order to verify effectiveness of this embodiment described above, a running test by a full-vehicle simulation is conducted. FIG. 7 illustrates a temporal change in the wheel load of the right front wheel, obtained by the running test. In FIG. 7, a solid line indicates this embodiment where the normal control and the wheel-load control are both performed, whereas a broken line indicates a comparative example where only the normal control is performed. As illustrated in FIG. 7, the control identification coefficient ψ at the rise of the lateral acceleration $A_y$ has an inverse sign to that at the fall of the lateral acceleration $A_y$. According to this embodiment in comparison with the comparative example, it is understood that a reduction in the wheel load each of the front wheels 2 is suppressed while an increase in the wheel load each of the front wheels 2 is promoted in a time zone in which the control identification coefficient ψ becomes positive to increase the wheel load each of the front wheels 2 (reduce the wheel load of each of the rear wheels 3). On the other hand, according to this embodiment in comparison with the comparative example, it is understood that the reduction in the wheel load each of the front wheels 2 is promoted while the increase in the wheel load each of the front wheels 2 is suppressed in a time zone in which the control identification coefficient ψ becomes negative to reduce the wheel load each of the front wheels 2 (increase the wheel load of each of the rear wheels 3).

As described above, according to the first embodiment, the damping-force command signal $I_{FR}$ according to the piston acceleration $a_{fr}$ and the damping-force command signal $I_{PR}$ according to the piston acceleration $a_{rr}$ are output while the lateral acceleration $A_y$ is increasing or reducing. Therefore, the wheel-load control according to the steering-wheel operation by the driver and the vehicle state can be performed. Accordingly, vehicle operation performance can be improved regardless of whether or not the antiskid brake system is actuated. As a result, marginal performance of the vehicle when, for example, the vehicle makes a turn can be enhanced. Moreover, appropriate wheel-load control suitable for the vehicle state can be performed according to the steering-wheel operation by the driver even before the actuation of the antiskid brake system. Therefore, the stability of the vehicle is enhanced, and hence the antiskid brake system is unlikely to be actuated. In addition, drive feeling during a normal operation is improved.

Further, in the antiskid brake system described in Japanese Patent Application Laid-open No. 2003-11635, the braked wheel is identified by complicated case classification and computation to increase the wheel load of the braked wheel and reduce the wheel load of the non-braked wheel. On the other hand, in the first embodiment, the wheel for which the wheel load is increased/reduced is identified based only on the information of the lateral acceleration $A_y$. Therefore, the complicated case classification and computation are not required. As a result, identification processing can be simplified.

Further, according to the G-Vectoring control described in Non-Patent Document 1, the deceleration control of the vehicle is performed according to the lateral motion of the vehicle. Therefore, the deceleration control is actuated when, for example, a lane change is made. As a result, there is a fear of occurrence of a change in velocity, which is not intended by the driver. On the other hand, in the first embodiment, only the wheel loads of the front wheels or the rear wheels are controlled according to the lateral acceleration $A_y$ without controlling the acceleration/deceleration of the vehicle. Therefore, even when a lane change is made, the velocity can be kept constant. In addition, the vehicle can be quickly accelerated and decelerated according to the operation of the accelerator or the brake by the driver. As a result, quick and stable cornering can be realized.

Figure 8:
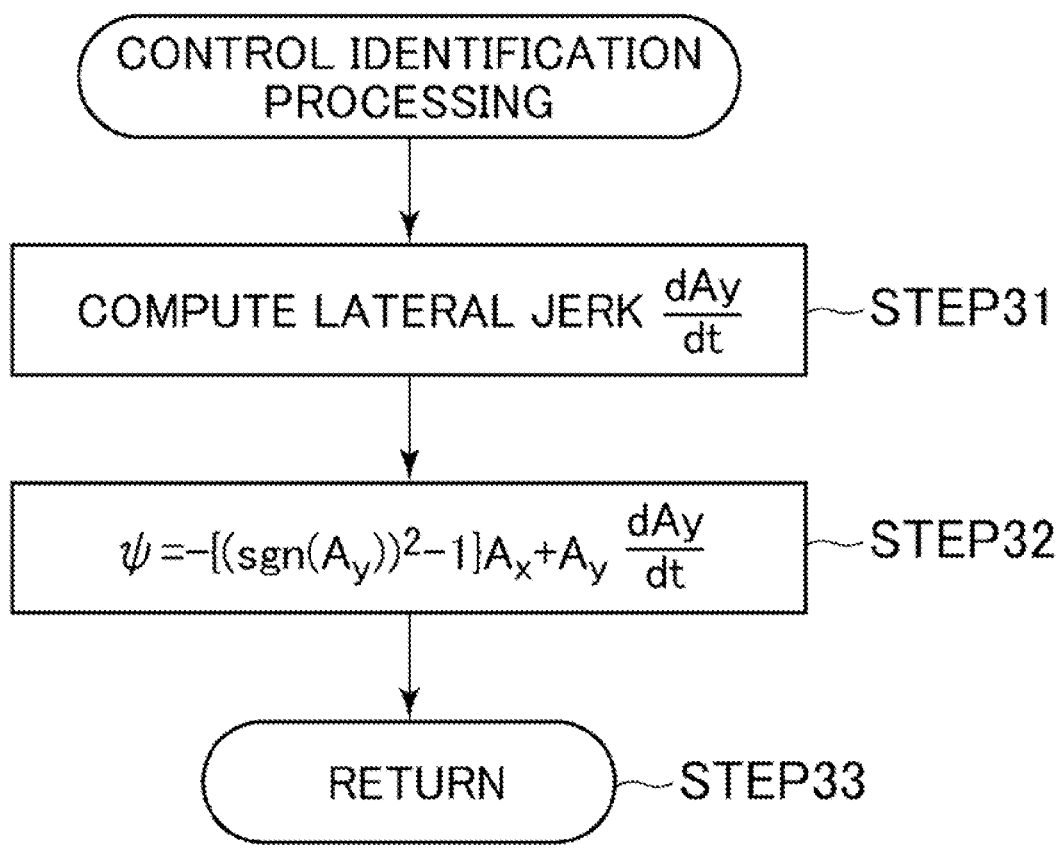
FIG. 8 is a flowchart illustrating control identification processing according to the second embodiment.
Figure 9:
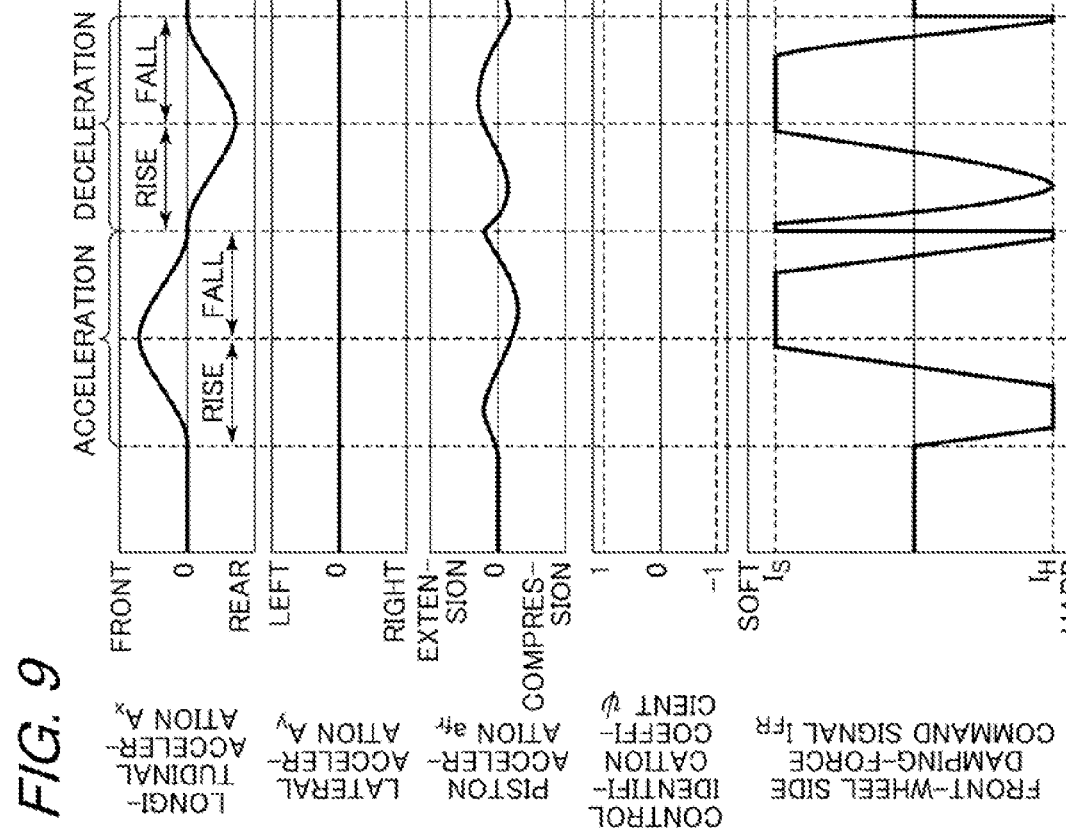
FIG. 9 is a characteristic line diagram schematically illustrating temporal changes in the longitudinal acceleration, the lateral acceleration, the piston acceleration, the control identification coefficient, and the front-wheel side damping-force command signal according to the second embodiment.

Next, FIGS. 8 and 9 illustrate a second embodiment of the present invention. The feature of the second embodiment resides in a configuration in which the wheel loads of the front wheels and the rear wheels are controlled according to the longitudinal acceleration when there is no increase or reduction in the lateral acceleration. In the second embodiment, the same components as those of the first embodiment described above are denoted by the same reference symbols, and the description thereof is herein omitted.

A controller 21 according to the second embodiment is configured substantially in the same manner as that of the controller 14 according to the first embodiment. The controller 21 executes the damping-force control processing for each wheel, which is illustrated in FIG. 3, as well as the wheel-load control illustrated in FIG. 5. However, control identification processing according to the second embodiment differs from the control identification processing according to the first embodiment, which is illustrated in FIG. 3. In the control identification processing according to the second embodiment, when there is no increase or reduction in the absolute value of the lateral acceleration $A_y$, the control identification coefficient ψ according to the longitudinal acceleration $A_x$ is output.

The control identification processing according to the second embodiment is described referring to FIG. 8. First, in Step 31, the lateral acceleration $A_y$ is subjected to temporal differentiation to compute the lateral jerk ($dA_y/dt$). Next, in Step 32, the control identification coefficient ψ is computed based on the lateral acceleration $A_y$ and the longitudinal acceleration $A_x$, as expressed by Formula 5 below. More specifically, in the term of Formula 5, which is proportional to the longitudinal acceleration $A_x$, a squared part of the sign function becomes 1 when the lateral acceleration $A_y$ is other than zero ($A_y\neq 0$). Therefore, zero is obtained by the calculation. On the other hand, in the term proportional to the longitudinal acceleration $A_x$, the longitudinal acceleration $A_x$ is directly calculated when the lateral acceleration $A_y$ is zero. As a result, in the term of Formula 5, which is proportional to the longitudinal acceleration $A_x$, a component obtained when the lateral acceleration $A_y$ does not change is computed by using the lateral acceleration $A_y$ and the longitudinal acceleration $A_x$.

In the term of Formula 5, which is proportional to the lateral acceleration $A_y$, the product of the lateral acceleration $A_y$ and the lateral jerk ($dA_y/dt$) is calculated as in the case of the control identification processing according to the first embodiment. As a result, in the term proportional to the lateral acceleration $A_y$, a component obtained when the lateral acceleration $A_y$ changes is computed. By adding the term proportional to the longitudinal acceleration $A_x$ and the term proportional to the lateral acceleration $A_y$, the control identification coefficient ψ is calculated by Formula 5. When the above-mentioned computation is terminated in Step 32, the processing proceeds to Step 33 to return.

$$\phi = -\{(\text{sgn}(A_y))^2 - 1\}A_x + A_y \frac{dA_y}{dt} \quad \text{[Formula 5]}$$

The suspension control apparatus according to the second embodiment executes the control processing described above. Next, characteristics of the damping-force command signals $I_{FR}$ and $I_{RR}$ while the vehicle is running are described referring to FIG. 9. FIG. 9 schematically illustrates temporal changes in the damping-force command signal $I_{FR}$ of one of the front wheels, and the like while the vehicle is running.

As illustrated in FIG. 9, when the absolute value of the lateral acceleration $A_y$ changes as in the case where the vehicle makes a turn, the damping-force command signal $I_{FR}$ changes according to the piston acceleration $a_{fr}$. More specifically, in a time zone in which the lateral acceleration $A_y$ rises, the damping-force command signal $I_{FR}$ increases or is unlikely to reduce the wheel load of each of the front wheels. As a result, the wheel load of each of the rear wheels is reduced or becomes unlikely to be increased. On the other hand, in a time zone in which the lateral acceleration $A_y$ falls, the damping-force command signal $I_{FR}$ reduces or becomes unlikely to increase the wheel load of each of the front wheels. As a result, the wheel load of each of the rear wheels is increased or becomes unlikely to be reduced. This point is common to the first embodiment.

On the other hand, when the vehicle accelerates or decelerates while moving linearly, the lateral acceleration $A_y$ remains unchanged whereas the longitudinal acceleration $A_x$ changes. In the second embodiment, however, even in the case where only the longitudinal acceleration $A_x$ changes, the damping-force command signal $I_{FR}$, $I_{FR}$ changes according to the piston acceleration $a_{fr}$. More specifically, in the time zone in which the longitudinal acceleration $A_x$ (of acceleration or deceleration) rises, the damping-force command signal $I_{FR}$ is set to the hard-side characteristic so that the wheel load of each of the front wheels is reduced or becomes unlikely to be increased. As a result, the wheel load of each of the rear wheels is increased or becomes unlikely to be reduced. In the time zone in which the longitudinal acceleration $A_x$ falls, the damping-force command signal $I_{FR}$ is set to the soft-side characteristic so that the wheel load of each of the front wheels is increased or becomes unlikely to be reduced. As a result, the wheel load of each of the rear wheels is reduced or becomes unlikely to be increased. As a result, in the second embodiment, a rate of increasing the wheel load is set variable according to the longitudinal acceleration $A_x$.

As described above, even in the second embodiment, substantially the same functions and effects as those of the first embodiment can be obtained. In the second embodiment, in particular, besides the wheel-load control performed when the lateral acceleration $A_y$ increases or reduces, the wheel-load control is performed according to the longitudinal acceleration $A_x$ even when there is no increase or reduction in the lateral acceleration $A_y$. Therefore, the wheel-load control can be performed according to the vehicle state in both the case where the vehicle makes a turn and the case where the vehicle moves linearly. As a result, turning performance including steering responsiveness and stability can be enhanced. In addition, braking/driving performance during linear movement including responsiveness and stability at the time of braking and that at the time of driving during the linear movement can be enhanced. As a result, the turning performance and the braking/driving performance during linear movement of the vehicle can be both enhanced.

Figure 10:
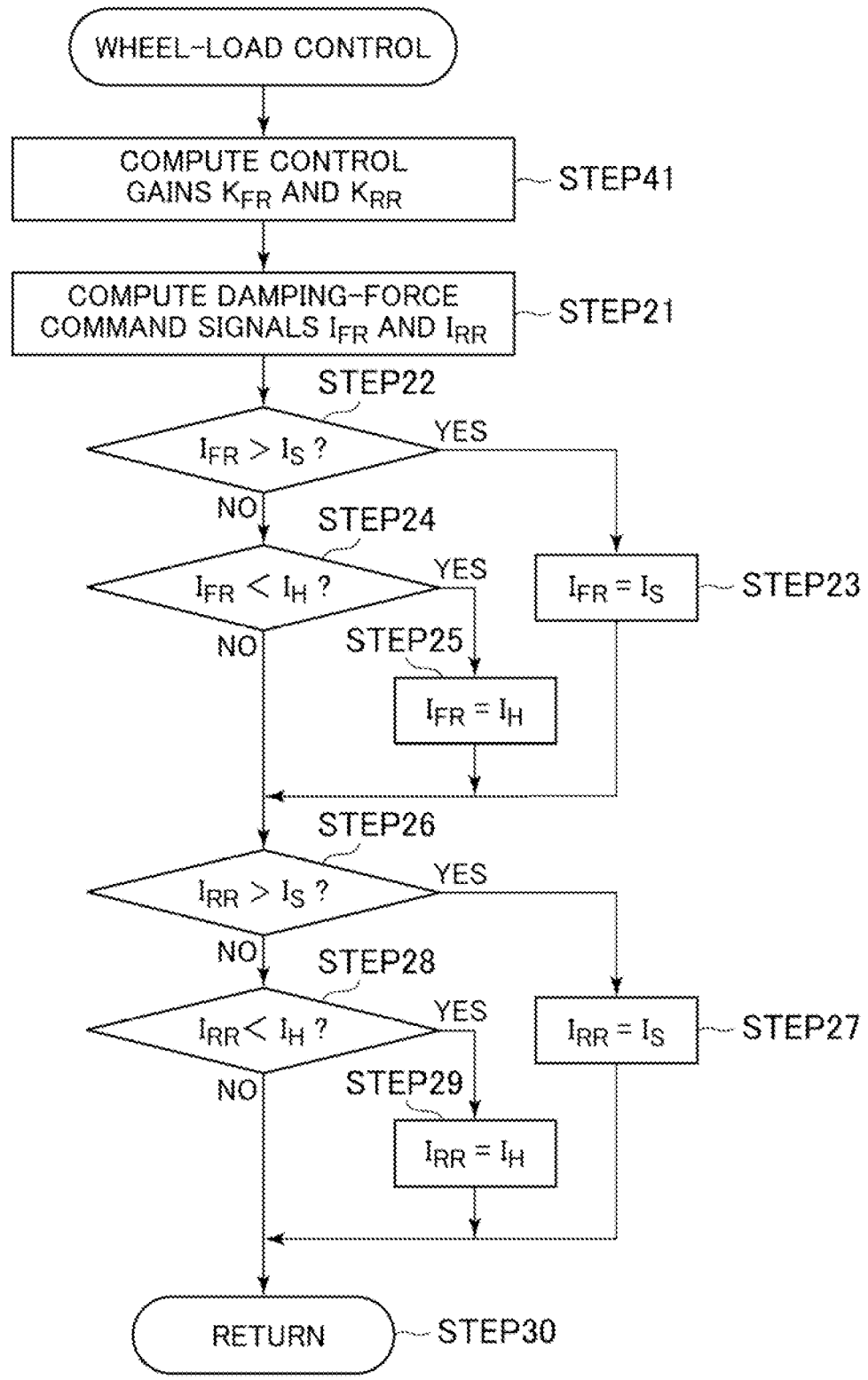
FIG. 10 is a flowchart illustrating wheel-load control according to the third embodiment.

Next, FIG. 10 illustrates a third embodiment of the present invention. The feature of the third embodiment resides in a configuration in which the control gains $K_{FR}$ and $K_{RR}$ are set variable by using the longitudinal acceleration $A_x$. In the third embodiment, the same components as those of the first embodiment described above are denoted by the same reference symbols, and the description thereof is herein omitted.

A controller 31 according to the third embodiment is configured substantially in the same manner as those of the controllers 14 and 21 according to the first and second embodiments. The controller 31 executes the damping-force control processing for each wheel, which is illustrated in FIG. 3, as well as the control identification processing illustrated in FIG. 4 or the control identification processing illustrated in FIG. 8. In contrast to the first embodiment, the control gains $K_{FR}$ and $K_{RR}$ are set variable by using the longitudinal acceleration $A_x$ and are used to compute the damping-force command signals $I_{FR}$ and $I_{RR}$ in the wheel-load control illustrated in FIG. 3.

Therefore, in the wheel-load control according to the third embodiment, as illustrated in FIG. 10, in Step 41, the control gains $K_{FR}$ and $K_{RR}$ are first computed based on the longitudinal acceleration $A_x$ and the lateral acceleration $A_y$ as expressed by Formulae 6 and 7 below. In Formulae 6 and 7, $C_{FR}$, $C_{RR}$, $C0_{FR}$, and $C0_{RR}$ are preset constants. Thereafter, as in the first embodiment, processing in Step 21 and the subsequent steps is performed so that the damping-force command signals $I_{FR}$ and $I_{RR}$ are computed by using the control gains $K_{FR}$ and $K_{RR}$.

$$K_{FR} = C_{FR}\text{sgn}\left(A_x A_y \frac{dA_y}{dt}\right)|A_x| + C0_{FR} \quad \text{[Formula 6]}$$

$$K_{RR} = C_{RR}\text{sgn}\left(A_x A_y \frac{dA_y}{dt}\right)|A_x| + C0_{RR} \quad \text{[Formula 7]}$$

The control gains $K_{FR}$ and $K_{RR}$ according to the third embodiment are now specifically described for the computation processing. As expressed by Formulae 6 and 7, when a product of the longitudinal acceleration $A_x$, the lateral acceleration $A_y$, and the lateral jerk $(dA_y/dt)$ is positive, the values of the control gains $K_{FR}$ and $K_{RR}$ are increased according to a magnitude of the longitudinal acceleration $A_x$. On the other hand, when the product of the longitudinal acceleration $A_x$, the lateral acceleration $A_y$, and the lateral jerk $(dA_y/dt)$ is negative, the values of the control gains $K_{FR}$ and $K_{RR}$ are reduced according to the magnitude of the longitudinal acceleration $A_x$. The reason for the computations described above is as follows.

In the G-Vectoring control, if the driver accelerates $(A_x>0)$ when the deceleration is to be performed because the product of the lateral acceleration $A_y$ and the lateral jerk $(dA_y/dt)$ is positive or the driver decelerates $(A_x<0)$ when the acceleration is to be performed because the product of the lateral acceleration $A_y$ and the lateral jerk $(dA_y/dt)$ is negative, it becomes difficult for the vehicle to respond to the steering by the driver. As a result, the steering responsiveness and the stability of the vehicle tend to be lowered.

Therefore, in this embodiment, if the driver performs the acceleration operation even though the deceleration is to be performed in the G-Vectoring control or the driver performs the deceleration operation even though the acceleration is to be performed in the G-Vectoring control, the control gains $K_{FR}$ and $K_{RR}$ are increased. As a result, the effects obtained by increasing or reducing the wheel load by the wheel-load control are increased so as to prevent the steering responsiveness and the stability from being lowered due to an erroneous driving operation by the driver.

On the other hand, in this embodiment, if the driver performs the deceleration operation when the deceleration is to be performed in the G-Vectoring control or the driver performs the acceleration operation when the acceleration is to be performed in the G-Vectoring control, the control gains $K_{FR}$ and $K_{RR}$ are reduced. In this case, the shift of the wheel load can be caused by the longitudinal acceleration $A_x$ generated by the driving operation performed by the driver. Therefore, the steering responsiveness and the stability can be improved by the driving operation performed by the driver even though the effects of the wheel-load control are small.

In view of the above-mentioned points, in this embodiment, when the product of the longitudinal acceleration $A_x$, the lateral acceleration $A_y$, and the lateral jerk $(dA_y/dt)$ is positive, the values of the control gains $K_{FR}$ and $K_{RR}$ are increased according to the magnitude of the longitudinal acceleration $A_x$ so as to increase the effects of the wheel-load control. On the other hand, when the product of the longitudinal acceleration $A_x$, the lateral acceleration $A_y$, and the lateral jerk $(dA_y/dt)$ is negative, the values of the control gains $K_{FR}$ and $K_{RR}$ are reduced according to the magnitude of the longitudinal acceleration $A_x$. Therefore, the effects of the wheel-load control are reduced.

As described above, substantially the same functions and effects as those of the first embodiment can be obtained in the third embodiment. In the third embodiment, in particular, the control gains $K_{FR}$ and $K_{RR}$ are set variable according to the longitudinal acceleration $A_x$. Therefore, for example, the effects of the erroneous driving operation by the driver are reduced to further enhance the steering responsiveness and the stability of the vehicle.

In the third embodiment, the control gains $K_{FR}$ and $K_{RR}$ are set variable based on the longitudinal acceleration $A_x$ and the like. However, the present invention is not limited thereto, and for example, as expressed by the following Formulae 8 and 9, the control gains $K_{FR}$ and $K_{RR}$ may be set variable based on the vehicle velocity $v_x$ and a steering angle $\theta$.

$$K_{FR}=C_{FR}|v_x\theta|+C0_{FR} \quad \text{[Formula 8]}$$

$$K_{RR}=C_{RR}|v_x\theta|+C0_{RR} \quad \text{[Formula 9]}$$

When the steering angle $\theta$ is large with respect to the vehicle velocity $v_x$ or the vehicle velocity $v_x$ is large with respect to the steering angle $\theta$, the vehicle is likely to be brought into a marginal running condition. Therefore, according to Formulae 8 and 9, the control gains $K_{FR}$ and $K_{RR}$ are increased in proportion to a product of the vehicle velocity $v_x$ and the steering angle $\theta$. As a result, as the vehicle condition becomes closer to the marginal running condition, the control gains $K_{FR}$ and $K_{RR}$ are increased to increase the effects of the wheel-load control. Accordingly, the steering responsiveness and the stability of the vehicle can be enhanced.

In each of the embodiments described above, the suspension devices 4 and 7 respectively include the damping-force variable dampers 6 and 9, each configured by the damping-force adjusting hydraulic shock absorber which is a so-called semi-active damper. However, the present invention is not limited thereto. For example, a pressure cylinder, such as a pneumatic or hydraulic active suspension, capable of adjusting the wheel load by feeding or discharging a fluid to increase or reduce an internal pressure may be used. Moreover, the present invention is applicable not only to the suspension device using the fluid but also to a ball-screw type or electromagnetic active suspension or the like.

Although both the front-wheel side wheel load and the rear-wheel side wheel load (damping-force command signals $I_{FR}$ and $I_{RR}$) are controlled when the absolute value of the lateral acceleration $A_y$ is increasing or reducing in each of the embodiments described above, only any one of the front-wheel side wheel load and the rear-wheel side wheel load may be controlled.

Further, although the wheel-load control is performed in both the case where the absolute value of the lateral acceleration $A_y$ is increasing and the case where the absolute value of the lateral acceleration $A_y$ is reducing in each of the embodiments described above, the wheel-load control may be performed in only any one of the case where the absolute value of the lateral acceleration $A_y$ is increasing and the case where the absolute value of the lateral acceleration $A_y$ is reducing.

Although the longitudinal acceleration sensor 13 is provided in each of the embodiments described above, the longitudinal acceleration sensor 13 may be omitted when the longitudinal acceleration $A_x$ is not used for computing the damping-force command signals $I_{FR}$ and $I_{RR}$ as in the first embodiment.

Further, the sprung acceleration sensors 10 and the unsprung acceleration sensors 11 are used to obtain the piston accelerations $a_{fr}$ and $a_{rr}$ by the computations in each of the embodiments described above. However, the present invention is not limited thereto. For example, a signal from a vehicle-height sensor for detecting a height of the vehicle body 1 may be used to obtain the piston accelerations $a_{fr}$ and $a_{rr}$ by the computations.

Further, by the sign inversion of the control identification coefficient $\psi$, it may happen that the damping-force command signals $I_{FR}$ and $I_{RR}$ are suddenly switched to vibrate the wheel load in each of the embodiments described above. Therefore, a lowpass filter may be provided to each of the control identification coefficient $\psi$ and the damping-force command signals $I_{FR}$ and $I_{RR}$.

Further, although the lateral acceleration sensor 12 and the longitudinal acceleration sensor 13 are used to detect the lateral acceleration $A_y$ and the longitudinal acceleration $A_x$ in each of the embodiments described above, other sensors may be used as long as the lateral acceleration $A_y$ and the longitudinal acceleration $A_x$ can be detected.

According to the embodiments described above, with the above-mentioned configuration, the wheel load of the wheel can be controlled according to the lateral acceleration of the vehicle to enhance the stability of the vehicle.

Although only some exemplary embodiments of this invention have been described in detail above, those skilled in the art will readily appreciate that many modifications are possible in the exemplary embodiments without materially departing from the novel teaching and advantages of this invention. Accordingly, all such modifications are intended to be included within the scope of this invention.

The present application claims priority to Japanese Patent Applications No. 2010-194247 filed on Aug. 31, 2010. The entire disclosure of Japanese Patent Applications No. 2010-194247 filed on Aug. 31, 2010, including specification, claims, drawings and summary is incorporated herein by reference in its entirety.

The entire disclosure of Japanese Patent Application Public Disclosure No. 2003-11635 including specification, claims, drawings and summary is incorporated herein by reference in its entirety.

The entire disclosure of non-patent documents 1 is incorporated herein by reference in its entirety.

What is claimed is:

1. A suspension control apparatus, comprising:
at least one wheel-load adjusting mechanism provided between a vehicle body and at least one wheel of a vehicle, and capable of adjusting a wheel load of the wheel by adjusting a force generated in a direction of a distance between the vehicle body and the wheel; and
a controller configured to control the wheel-load adjusting mechanism to perform a wheel load control,
wherein the controller controls the wheel-load adjusting mechanism in at least one of the following manners:
the wheel load of at least one front wheel is increased or is substantially prevented from being decreased relative to that before an absolute value of a lateral acceleration of the vehicle is increasing, according to a damping-force command signal proportional to a vertical acceleration between the vehicle body and the at least one front wheel of the vehicle, when the absolute value of a lateral acceleration of the vehicle is increasing; and
the wheel load of at least one rear wheel is increased or is substantially prevented from being decreased relative to that before the absolute value of the lateral acceleration of the vehicle is decreasing, according to the damping-force command signal proportional to the vertical acceleration between the vehicle body and the at least one rear wheel of the vehicle, when the absolute value of the lateral acceleration of the vehicle is decreasing.

2. A suspension control apparatus according to claim 1, wherein the at least one front wheel comprises right and left front wheels, the at least one rear wheel comprises right and left rear wheels,
wherein the at least one wheel-load adjusting mechanism comprises a plurality of wheel-load adjusting mechanisms provided between the vehicle body and the front and rear wheels, and
wherein the wheel-load adjusting mechanisms are controlled in at least one of the following manners:
the wheel loads of the right and left front wheels are increased or are substantially prevented from being decreased when the absolute value of the lateral acceleration of the vehicle is increasing; and
the wheel loads of the right and left rear wheels are increased or are substantially prevented from being decreased when the absolute value of the lateral acceleration of the vehicle is decreasing.

3. A suspension control apparatus according to claim 1, wherein the at least one front wheel comprises right and left front wheels, and the at least one rear wheel comprises right and left rear wheels,
wherein the at least one wheel-load adjusting mechanism comprises a plurality of wheel-load adjusting mechanisms provided between the vehicle body and the front and rear wheels, and
wherein the wheel-load adjusting mechanisms are controlled in at least one of the following manners:
the wheel loads of the right and left front wheels are increased or are substantially prevented from being decreased regardless of a direction of a longitudinal acceleration when the absolute value of the lateral acceleration of the vehicle is increasing; and
the wheel loads of the right and left rear wheels are increased or are substantially prevented from being decreased regardless of the direction of the longitudinal acceleration when the absolute value of the lateral acceleration of the vehicle is decreasing.

4. A suspension control apparatus according to claim 1, wherein the wheel-load adjusting mechanism is controlled in at least one of the following manners:
the wheel load of the at least one rear wheel is decreased or is substantially prevented from being increased relative to that before the absolute value of the lateral acceleration of the vehicle is increasing, according to the vertical acceleration between the vehicle body and the at least one rear wheel of the vehicle, regardless of a direction of a longitudinal acceleration when the absolute value of the lateral acceleration of the vehicle is increasing; and
the wheel load of the at least one front wheel is decreased or is substantially prevented from being increased relative to that before the absolute value of the lateral acceleration of the vehicle is decreasing, according to the vertical acceleration between the vehicle body and the at least one front wheel of the vehicle, regardless of the direction of the longitudinal acceleration when the absolute value of the lateral acceleration of the vehicle is decreasing.

5. A suspension control apparatus according to claim 1, wherein the controller is configured to change a rate of increase of the wheel load according to a magnitude of a longitudinal acceleration.

6. A suspension control apparatus according to claim 5, wherein the controller is configured to be connected to a third detecting device, and configured to obtain the longitudinal acceleration based on one or more signals from the third detecting device.

7. A suspension control apparatus according to claim 1, wherein the controller increases the wheel load or substantially prevents the wheel load from decreasing at least when the vehicle accelerates in a forward direction.

8. A suspension control apparatus according to claim 1, wherein the wheel-load adjusting mechanism comprises a damping-force adjusting type shock absorber capable of adjusting a damping-force characteristic between a soft characteristic and a hard characteristic.

9. A suspension control apparatus according to claim 1, wherein the wheel-load adjusting mechanism comprises a pressure cylinder capable of adjusting the wheel load by one of feeding and discharging of a fluid to increase and reduce an internal pressure.

10. A suspension control apparatus according to claim 1, wherein the wheel-load adjusting mechanism comprises an electromagnetic active suspension.

11. A suspension control apparatus according to claim 1, wherein the controller is configured to be connected to a first detecting device and a second detecting device, and configured to obtain the lateral acceleration of the vehicle based on one or more signals from the first detecting device and obtain the vertical acceleration between the vehicle body and the wheel of the vehicle based on one or more signals from the second detecting device.

12. A suspension control apparatus according to claim 11, wherein the first detecting device comprises a lateral acceleration sensor, and the second detecting device comprises a sprung acceleration sensor at the vehicle body side and an unsprung acceleration sensor at the wheel side.

13. A suspension control apparatus according to claim 1, wherein the damping-force command signal is computed by multiplying the vertical acceleration by a predetermined control gain.

14. A suspension control apparatus according to claim 1, wherein saturation processing of the damping-force command signal is performed so that the damping-force command signal has a value within a range between a hard command signal and a soft command signal.

15. A suspension control apparatus, comprising:
a wheel-load adjusting mechanism provided between a vehicle body and a wheel of a vehicle, and capable of adjusting a wheel load of the wheel by adjusting a force generated in a direction of a distance between the vehicle body and the wheel; and
a controller configured to control the wheel-load adjusting mechanism to perform a wheel load control,
wherein the controller controls the wheel-load adjusting mechanism in at least one of the following manners:
the wheel load of a rear wheel is decreased or is substantially prevented from being increased relative to that before an absolute value of a lateral acceleration of the vehicle is increasing, according to a damping-force command signal proportional to a vertical acceleration between the vehicle body and the wheel of the vehicle, when the absolute value of a lateral acceleration of the vehicle is increasing; and
the wheel load of a front wheel is decreased or is substantially prevented from being increased relative to that before the absolute value of the lateral acceleration of the vehicle is decreasing, according to the damping-force command signal proportional to the vertical acceleration between the vehicle body and the wheel of the vehicle, when the absolute value of the lateral acceleration of the vehicle is decreasing.

16. A suspension control apparatus according to claim 15, wherein the controller is configured to be connected to a first detecting device and a second detecting device, and configured to obtain the lateral acceleration of the vehicle based on one or more signals from the first detecting device and obtain the vertical acceleration between the vehicle body and the wheel of the vehicle based on one or more signals from the second detecting device.

17. A suspension control apparatus according to claim 16, wherein the first detecting device comprises a lateral acceleration sensor, and the second detecting device comprises a sprung acceleration sensor at the vehicle body side and an unsprung acceleration sensor at the wheel side.

18. A suspension control apparatus according to claim 15, wherein the damping-force command signal is computed by multiplying the vertical acceleration by a predetermined control gain.

19. A suspension control apparatus according to claim 15, wherein saturation processing of the damping-force command signal is performed so that the damping-force command signal has a value within a range between a hard command signal and a soft command signal.

20. A suspension control apparatus, comprising:
a wheel-load adjusting mechanism provided between a vehicle body and a wheel of a vehicle, and capable of adjusting a wheel load of the wheel by adjusting a force generated in a direction of a distance between the vehicle body and the wheel; and
a controller configured to control the wheel-load adjusting mechanism, wherein:
the wheel-load adjusting mechanism adjusts the force generated in the direction of the distance between the vehicle body and the wheel according to at least one of a front-wheel side damping-force command signal $I_{FR}$ and a rear-wheel side damping-force command signal $I_{RR}$; and
the controller uses a lateral acceleration $A_y$, a lateral jerk $dA_y/dt$, a front-wheel side piston acceleration $a_{fr}$, a rear-wheel side piston acceleration $a_{rr}$, tuning control gains $K_{FR}$, $K_{RR}$, $I0_{FR}$, and $I0_{RR}$, and a sign function sgn so that at least one of the front-wheel side damping-force command signal $I_{FR}$ and the rear-wheel side damping-force command signal $I_{RR}$ satisfies the following relations:

$$I_{FR} = \text{sgn}\left(A_y \frac{dA_y}{dt}\right) K_{FR} a_{fr} + I0_{FR}$$

$$I_{RR} = -\text{sgn}\left(A_y \frac{dA_y}{dt}\right) K_{RR} a_{rr} + I0_{RR}.$$

21. A suspension control apparatus according to claim 20, wherein saturation processing of at least one of the front-wheel side damping-force command signal $I_{FR}$ and the rear-wheel side damping-force command signal $I_{RR}$ is performed so that the at least one of the front-wheel side damping-force command signal $I_{FR}$ and the rear-wheel side damping-force command signal $I_{RR}$ has a value within a range between a hard command signal and a soft command signal.

* * * * *